United States Patent [19]

Nakajima et al.

[11] Patent Number: 5,115,424
[45] Date of Patent: May 19, 1992

[54] OPTICAL STORAGE MEDIUM WITH PROVISION FOR LIMITATION OF THERMAL CONDUCTION

[75] Inventors: Hajime Nakajima; Isao Watanabe; Kunimaro Tanaka, all of Hyogo, Japan

[73] Assignee: Mitsubishi Denki Kabushiki Kaisha, Japan

[21] Appl. No.: 301,329

[22] Filed: Jan. 23, 1989

[30] Foreign Application Priority Data

Jan. 22, 1988 [JP]  Japan .................................. 63-10790

[51] Int. Cl.$^5$ .............................................. G11B 7/24
[52] U.S. Cl. .............................. 569/275.4; 369/275.1; 369/284; 369/286; 346/135.1
[58] Field of Search ....................... 369/275.4, 279, 278, 369/277, 284, 286, 109, 100, 44, 46, 275.1, 275.2; 346/135.1; 430/945, 495

[56] References Cited

U.S. PATENT DOCUMENTS

| | | | |
|---|---|---|---|
| 4,230,915 | 10/1980 | Dil et al. | 369/275 |
| 4,547,875 | 10/1985 | Ohta et al. | 369/109 |
| 4,586,173 | 4/1986 | Ando | 369/109 X |
| 4,731,755 | 3/1988 | Bjorklund et al. | 369/284 |
| 4,734,904 | 3/1988 | Imanaka et al. | 369/275 X |
| 4,930,116 | 5/1990 | Dil | 369/275.1 |

FOREIGN PATENT DOCUMENTS

| | | | |
|---|---|---|---|
| 55-55449 | 4/1980 | Japan . | |
| 60-79544 | 5/1985 | Japan | 369/13 |
| 60-133554 | 7/1985 | Japan | 369/275.1 |
| 1190405 | 11/1985 | U.S.S.R. . | |

Primary Examiner—Stuart S. Levy
Assistant Examiner—Hoa Nguyen
Attorney, Agent, or Firm—Wolf, Greenfield & Sacks

[57] ABSTRACT

An optical type information record carrier is disclosed which includes an arrangement wherein the depth of the guide grooves is selected to be about $(2N+1)\lambda/8n$ ($N=1, 2, 3, \ldots$) and the inclination angle of the wall surface of the carrier is steep enough to ensure that the information recording medium will not adhere to the wall surface of the guide grooves, or will only adhere very weakly if it does adhere. Thermal conduction at the wall surface of the guide grooves is prevented so that extension of the recording bits is restricted.

6 Claims, 13 Drawing Sheets

OPTICAL STORAGE MEDIUM WITH PROVISION FOR LIMITATION OF THERMAL CONDUCTION

BACKGROUND OF THE INVENTION

1. Field of the Invention

The present invention relates to an optical type information record carrier and more specifically to an optical type information record carrier including an information recording medium adapted to store information records and modulate the light reflected therefrom depending on the content of the recorded information, and adapted to condense the light into a fine spot and irradiate it along information recording tracks on the information recording medium and intensify the light intensity to increase the temperature locally in the area irradiated by the light for writing fine information bits, as well as regenerating the information by detecting modulation of the light reflected from the information bits by condensing and irradiating weak light that is insufficiently strong to execute writing.

2. Prior Arts

Figure 1:
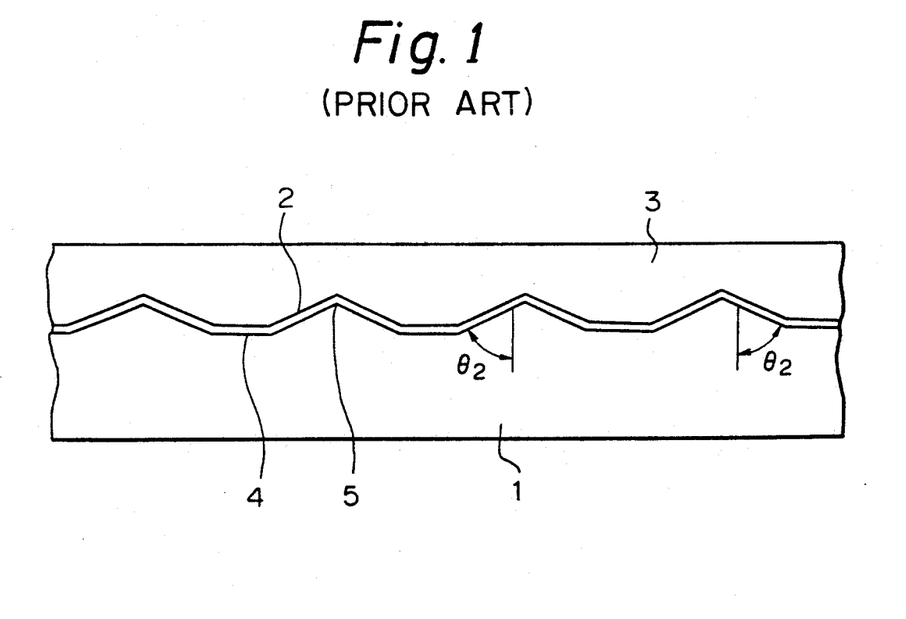
FIG. 1 is a sectional view of the optical type information record carrier.

FIG. 1 illustrates an optical type information record carrier according to a prior art as disclosed in U.S. Pat. No. 4,930,116 and in Japanese Patent Public Disclosure No. 55-55449, wherein the information recording medium 2 provided on the transparent base member 1 having the refractive index of n comprises a composite thin membrane for punch recording, organic pigment, amorphous magnetic material for opto-magnetic recording, phase change material and so forth. The protective layer 3 is normally made of plastic material. However, such a protective layer is sometimes not used and the air takes its place. The information recording medium 2 comprises the lands 4 and the guide grooves 5 which are adapted to guide the light spots for regeneration of the information records to the information recording tracks.

According to the method of regenerating information records by condensing the five light spots onto the information record carrier and recording and regenerating the information by means of said light spots, the information record carrier normally has a circular shape (disc) and the light spots are so controlled as to trace the information recording tracks having a spiral or concentric configuration thereby regenerating the record of information. Control designed to cause said light spots to trace the information recording tracks has to be precisely executed at the center of the information recording tracks. Should the light spots be off-set from the center of the information recording tracks, the amplitudes of the regeneration signals may be reduced or confusion between the adjacent tracks may be caused. It is therefore necessary that, tracking error signals representing the position relative to the center of the tracks of which information records are being recorded or reproduced by the light spots are taken out during the process of recording or reproducing information and supplied to the servo system which in turn adjusts the position of the light spots. One of the methods often used for detecting the position of the light spots in relation to the information recording tracks is the so-called push-pull detection method in which guide grooves 5 having a specified depth are engraved into the base member 1 of a disk as shown in FIG. 1. According to this method, the information recording tracks are established along the center of the guide grooves 5 or the center of the lands 4 between the guide grooves 5.

Figure 2:
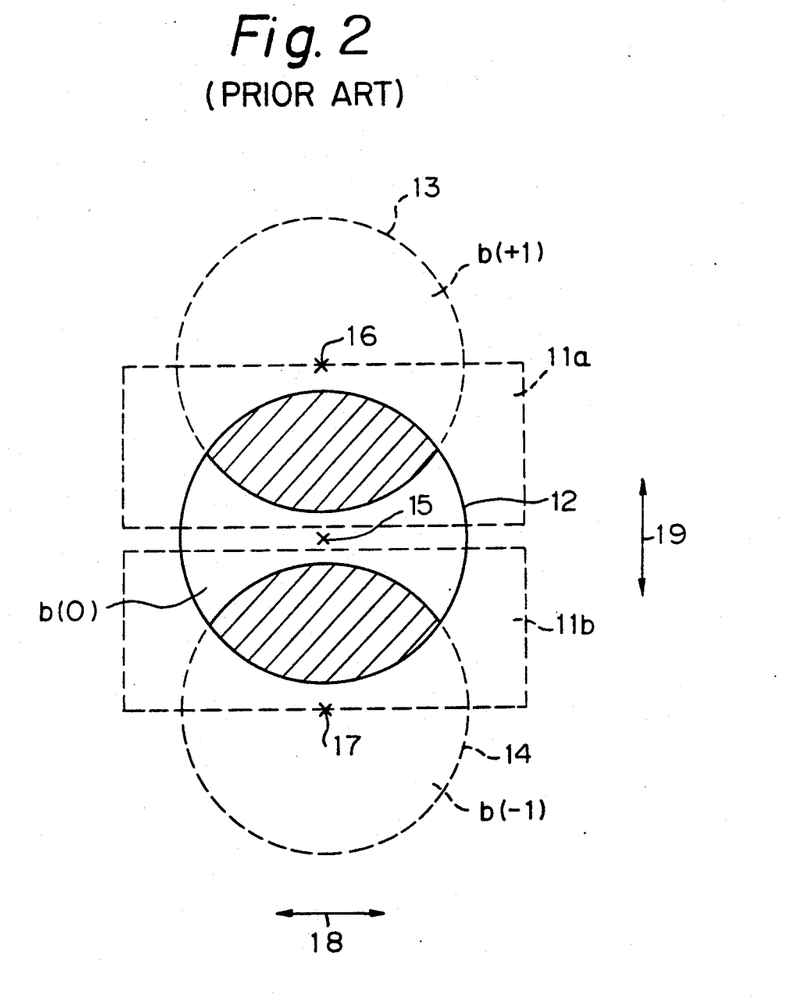
FIG. 2 is a schematic view illustrating the push-pull detection method.

Some explanation will be given below with regard to this push-pull detection method. As shown in FIG. 1, if the information record carrier provided with guide grooves 5 is cut in the direction of tracking (or the direction vertical to the information recording tracks), the guide grooves are found to be arranged with a cyclic structure and they may be regarded as a diffraction grating relative to the light beam for recording reproduction. Accordingly the light reflected from the light spots may be separated to any order of diffraction light and, like the optical discs which are in general use, when a disc having a pitch between grooves (or track pitch p) of about 1.6 $\mu$m is irradiated with a semi-conductor laser beam (having a wave length of $\lambda=780$ nm–850 nm) which is condensed by an object lens having an aperture number of 0.5–0.55, the light reflected by the optical disc and incident again on the object lens will be seen as shown in FIG. 2. As a result of this, the intensity of the reflected light may be detected by two divided light detectors 11a and 11b through the reproduction optical system. In FIG. 2, the arrows indicate the directions of the light over the optical disc, the arrow 18 indicating the direction of the information recording tracks and the arrow 19 indicating the direction vertical to said tracking direction. The circle 12 defines the range of the zero-th diffraction light b(0) and corresponds to the projection aperture of the object lens. Since the positive primary diffraction light b(+1) and the negative primary diffraction light b(−1) are reflected with the diffraction angle p/$\lambda$ radian by the effect of the diffraction grating, the center 16 of the positive primary diffraction light b(+1) and the center 17 of the negative primary diffraction light b(−1) deviate from the center 15 of the zero-th diffraction light b(0) and respectively take the positions shown by the circles 13 and 14. It can be seen therefore that only these portions of the primary diffraction lights, which are shown as shaded portions in FIG. 2, whether they are positive or negative, are allowed to pass through the projection aperture of the object lens and to reach the light detectors 11a and 11b. It is to be noted that the portion of the light flux which will reach the light detector, which is shown shaded in FIG. 2, is the area of intereference between the zero-th diffraction light b(0) and the negative and positive primary diffraction lights b(+1) and b(−1) and the light intensity will vary depending on the phase differrence of said diffraction lights. The phase difference $\phi(+1)$ and $\phi(-1)$ between the zero-th diffraction light b(0) and the positive and negative primary diffraction lights b(+1) and b(−1) may be expressed respectively by the following equations.

$$\phi(+1) = \phi + 2\pi \frac{\Delta e}{p}$$

$$\phi(-1) = \phi - 2\pi \frac{\Delta e}{p}$$

where $\phi$ signifies the phase difference between the zero-th diffraction light and the primary diffraction light when the light spot is located at the center of the information recording tracks, $\Delta e$ signifies the deviation of the light spot relative to the information recording tracks, and p signifies the pitch between tracks. Corresponding to said phase difference, the output S(+1) of the light detector 11a and the output S(−1) of the light detector 11b may be expressed by the following equations.

$$S(+1) = A_1(\phi)\cos\left(\phi + 2\pi\frac{\Delta e}{P}\right) + A_0(\phi)$$

$$S(-1) = A_1(\phi)\cos\left(\phi - 2\pi\frac{\Delta e}{P}\right) + A_0(\phi)$$

where $A_1(\phi)$ and $A_0(\phi)$ relate to the diffraction efficiency of the positive and negative diffraction lights and are functions of $\phi$.

The tracking error signal $S_t$ can be obtained as follows by the difference between said two outputs.

$$S_t = S(+1) - S(-1) = -2A_1(\phi)\cdot\sin\phi\cdot\sin 2\pi\frac{\Delta e}{P}$$

It is to be noted here that the component $$\sin 2\pi\frac{\Delta e}{P}$$

is the odd function of Δe. Accordingly, the tracking error signals $S_t$ contain such information as that regarding the amount of any positional error and the direction of the light spots relative to the information recording tracks $A_1(\phi)\sin\phi$ designates the amplitude of the tracking error signals $S_t$ and takes its maximum value when $\phi=115°$, which matter is discussed in said U.S. Pat. No. 4,930,116 and in said Patent Public Disclosure No. 55-55449. It is believed that $\phi=100°$ is preferable if the uneven bit signals to be described are to be read out. However, said phase difference is normally set in the range of 90° to 110° in the case of manufacturing discs and the geometrical depth of the guide groove 5 is set near λ/8n. λ is the wave length of the light in a free space and n is the angle of refraction of the basic member.

In the optical type information record carrier in which a user can write information and to which the present invention relates, access to a desired information recording track in the information record carrier is required and the address information is written in the carrier from the outset at the time of manufacturing the carrier. This arrangement will now be explained by reference to FIGS. 3 through 5 in connection with an optical disc having a constant angular velocity (CAV).

Figure 3:
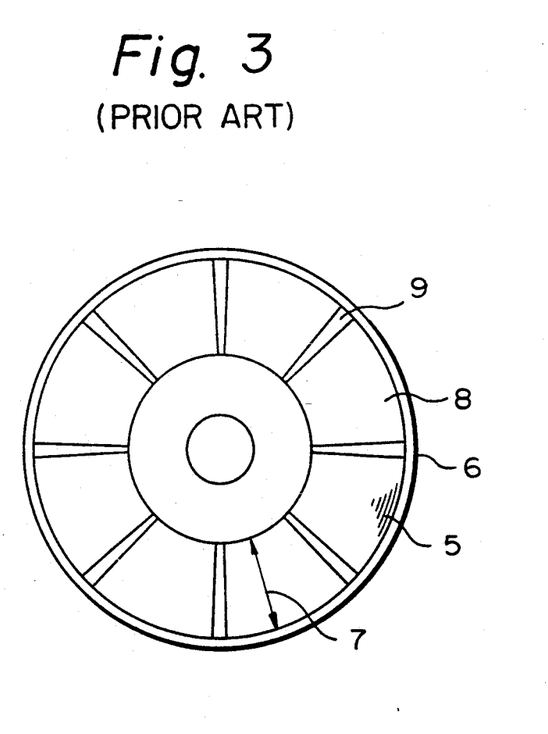
FIG. 3 is a plan view of the photo-disc.
Figure 4:
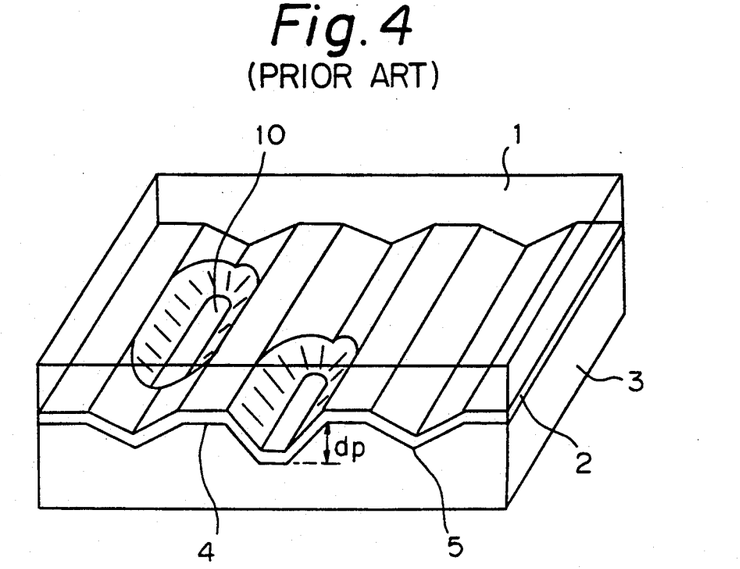
FIGS. 4 and 5 are perspective views showing the uneven bits at the header area, and FIGS. 6 (a-d) 6 and 7 are a partially sectional view and a schematic view illustrating the steps of forming recording bits.
Figure 5:
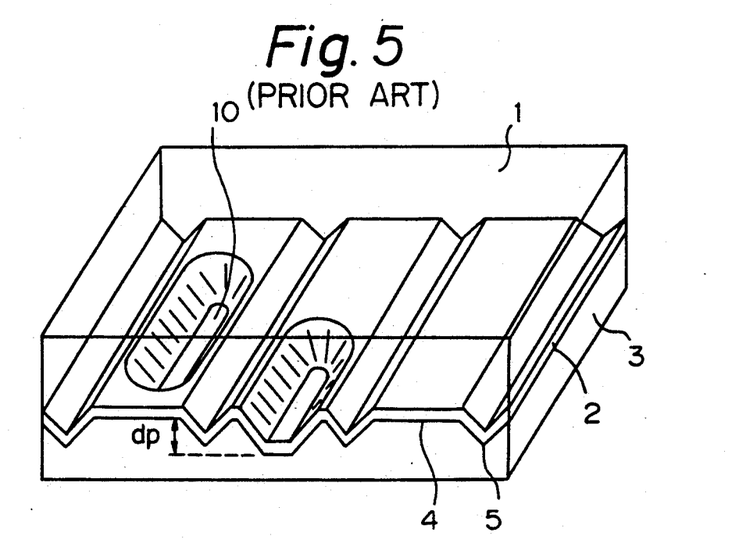

In FIG. 3, the optical disc 6 is defined by the outermost circle and the innermost circle. The area defined by said circles is the information area in which spiral or concentric circular guide grooves are engraved, said information area being designated by the arrow 7 and having a doughnut-like configuration. It is to be further noted that said information area 7 is further divided into the header area 9 where address information is recorded and the recording area 8 where users may record information. Information pit arrays of address information and pit synchronous signals are written in the information recording tracks of the header area 9. Since the information in the header area 9 is identical in respective discs, it is normally replicated as uneven pits simultaneously with the guide grooves 5 in the optical disc base member 1 of each disc from the viewpoint of maximizing productivity. The normal arrangement of the uneven pit arrays in the header area 9 which has been utilized is shown in FIG. 4 and FIG. 5, respectively. FIG. 4 illustrates the constitution of information bits as disclosed in the above-mentioned U.S. Pat. No. 4,930,116 and in the above-mentioned Patent Public Disclosure No. 55-55449. The information bit 10 is formed by further deepening the guide grooves 5 and the information may be read out by detecting the total amount of light incident on the light detectors 11a and 11b as shown in FIG. 2. It is known that the phase difference between the zero-th diffraction light and the positive and negative primary diffraction light should preferably be 180° in order to maximize the variation of said total amount of light or depth of modulation of the regeneration signals. And it is believed that the geometrical depth dp of the bit which provides said 180° phase difference should be λ/4n (where λ is the wave length of the light in a free space and n is the index of refraction of the base member.)

FIG. 5 shows that the information recording tracks are placed centrally of the lands 4 and that uneven bits 10 are engraved separately from the guide grooves 5. It is to be noted, however, that the principle of reading the information out is the same as that for FIG. 4 and the geometrical depth dp of the bits is decided as λ/4n.

Figure 6A:
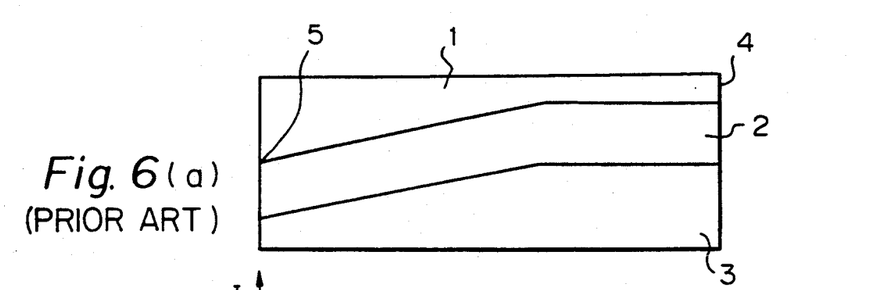
Figure 6B:
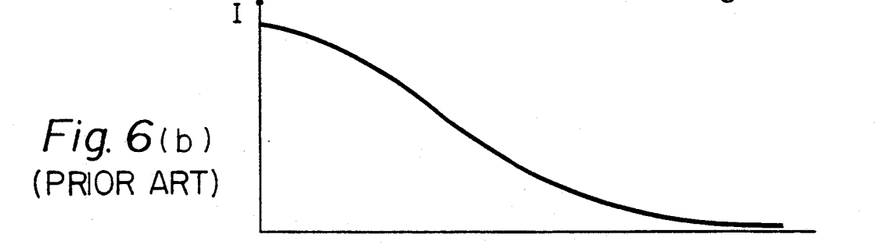
Figure 6C:
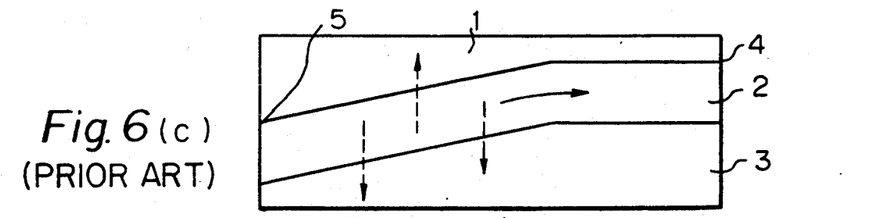
Figure 6D:
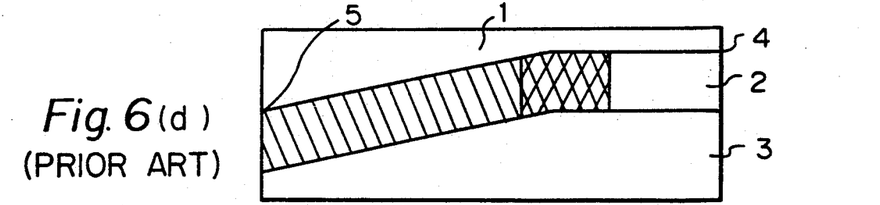
Figure 7:
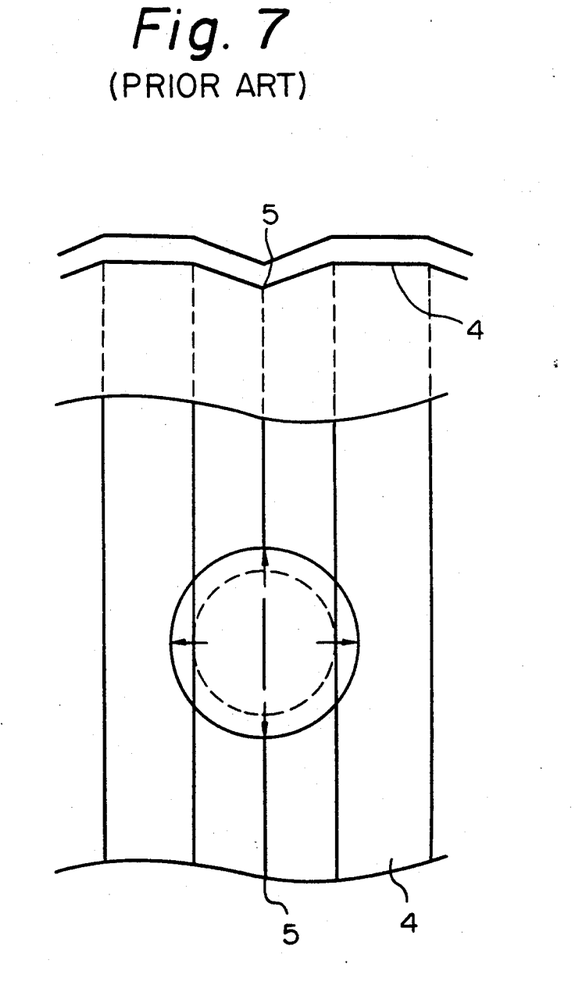

In the optical type information record carrier according to the prior art explained above, a problem occurs when the information recording medium has good thermal conductivity due to the propagation of heat at the time of recording. This problem will be explained by referring to FIGS. 6 and 7. FIG. 6(a) is a sectional view of an information record carrier in which one half of the track extending from the center of the guide groove 5 to the center of the land 4 is shown. For the purpose of the present explanation, the information recording medium 2 is understood to be made of an amorphous magnetic material to be used for opto-magnetic recording. The recording provided in the opto-magnetic recording is executed in such a manner that the intensity of the laser beam will be increased and the temperature of the information recording medium 2 within the light spot will be increased locally to a degree exceeding the Curie point, whereby magnetization will be reversed to record the information bits. The intensity distribution of the light spots at the time of recording is shown in FIG. 6(b), wherein the ordinate indicates the intensity I of light and the abscissa indicates the location thereof and corresponds to the abscissa of FIG. 6(a). It is seen that, at the initial stage of irradiation of the laser beam, the temperature distribution is proportionate to the intensity distribution of the light as shown is FIG. 6(b) owing to the supply of caloric energy by the laser beam but, as time elapses, the temperature distribution will be extended owing to thermal conduction. The degree of extension of the temperature distribution depends on the coefficient of thermal conductivity of the different material which constitute the information recording medium. Since the coefficient of thermal conductivity of such amorphous magnetic materials as one used for the information recording medium 2 is far higher than that of the glass or plastic materials used for the base member 1 and the protective layer 3, the temperature distribution thereof will be extended substantially along the information recording medium 2 as indicated by the arrowed solid line shown in FIG. 6(c) and escape of the heat in the direction indicated by the arrowed broken line shown in the same figure may be ignored. It is to be noted that in an opto-magnetic record carrier of the type having temperature characteristics like those explained above, the size of a recording bit obtained by the light irradiation energy given by the product of the light intensity and the light irradiation time and the thermal capacity of the information recording medium 2 is different from the size of the actual recording bits, and the higher the irradiation energy is, the larger will be the recording bits formed by the light spots. FIGS. 6 and 7 illustrate the above-mentioned relationship. The diagonally hatched area in FIG. 6 (d) represents the area in which the recording bits are formed if the Curie temperature is exceeded and without the effect of thermal conductivity, which the cross-hatched area in FIG. 6 (d) represents the area of the recording bits extended by the effect of thermal conductivity. FIG. 7 is a plan showing extension of the recording bits in the same manner as in FIG. 6. The diagonally hatched area in FIG. 6 (d) corresponds to the circle defined by the dotted line in FIG. 7 and the cross-hatched area is also included in the circle defined by the solid line in FIG. 7. As explained above, in a recording process involving thermal conduction, the greater the energy of the irradiated light, the more recording bits are extended until these bits reach the land portion 4.

Next consideration is given to the reproduction of a track, in regard to a case where arrays of recording bits as explained above are recorded in a plurality of information tracks. For recording, only the central portion of the light spot is effective for forming the record bits as this is where the light energy is strong enough to ensure that sufficient caloric energy is supplied. In the case of regeneration of the recording, however, even the outer marginal portion of the light spot where the light energy is not so strong will be sufficiently effective to generate the regeneration signals so long as the reflected light can be returned to the light detector. In the photo-disc apparatus in current use, the pitch between the tracks and the size of the light spot are established to be substantially equal. A recording bit in the adjacent track which has been extended into the land 4 from the guide groove 5 is read out as cross talk which may degrade the quality of signals. Further in a case where the recording power of the laser has been varied, the recording bits which have been spread out by the higher power will remain unerased since they are not erased by the recording and erasing operation conducted at a low power level. Should such a recording track be regenerated, this unerased portion will be read out as noise since the reading-out range at the time of reproduction is wide. Further since the light spots do not always track the center of the information recording track perfectly but to a certain extent track in a zig-zag manner, discordant tracking due to the zig-zag motion of the light spots at the time of re-recording will reproduct the unerased portion, and noise may this be caused for the same reason as explained alone. Furthermore, if any deviation is caused for some reason in the tracking servo system, the position of the target to be followed by the light spot will deviate from the center of the information recording tracks, so that any discord of the recording area which may be caused before and after generation of this deviation will also cause zig-zag motion of the light spot and generation of noise due to the presence of the unerased record portion.

SUMMARY OF THE INVENTION

The Present invention has been proposed to solve the problems explained above and has as its an object the provision of an optical type information record carrier adapted to restrict the extension of recording bits transversely of the track, reduce cross talk and eliminate noise due to the presence of unerased record portions.

In the optical type information record carrier according to the present invention, the depth of the guide grooves is selected to be about $$\frac{2N+1}{8n} \lambda$$

($N=1, 2, 3, \ldots$) and the inclination angle of the wall surface of the guide grooves relative to the wall surface of the carrier is made steep enough to ensure that the information recording medium will not adhere to the wall surface of the guide grooves or, if it does adhere, will only do so weakly.

In accordance with the present invention, thermal conduction at the wall surface of the guide grooves is prevented so that extension of the recording bits can be restricted.

BRIEF EXPLANATION OF THE DRAWINGS

FIGS. 1 to 7 show an optical type information record carrier according to a prior art, wherein

FIGS. 8 to 13 illustrate an embodiment of the present invention, wherein

DESCRIPTION OF THE PREFERRED EMBODIMENTS

Figure 8:
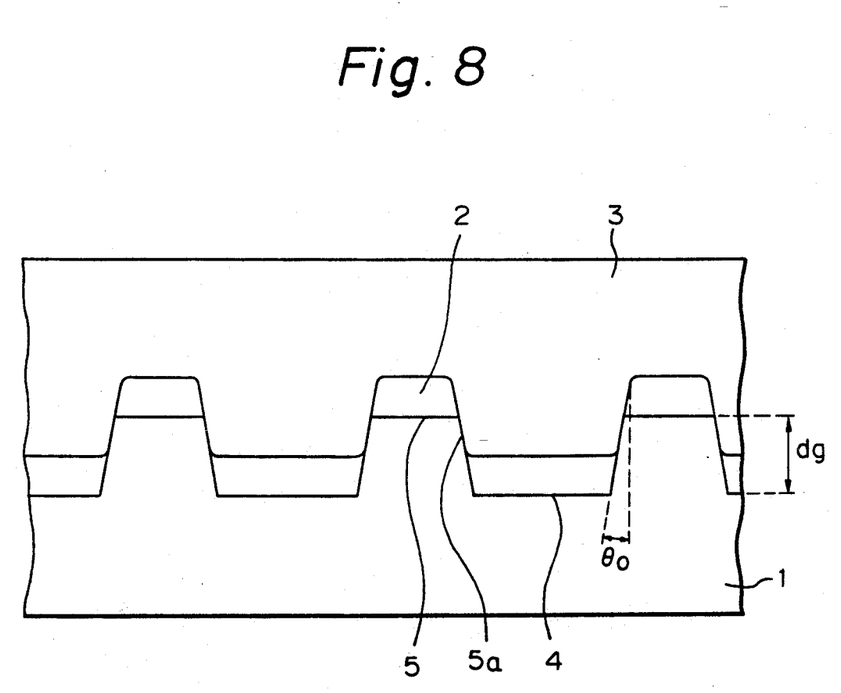
FIG. 8 is a sectional view thereof, FIGS. 9 (a-d) and FIG. 10 are a partially sectional view and a schematic view illustrating the steps of forming the recording bits.

An embodiment of the present invention will now be explained by referring to FIGS. 8 through 13. In these drawings, the same reference symbols are employed to denote portions equivalent to those explained in the above description of the prior art. Referring first to FIG. 8, the inclination angle $\theta_0$ of the wall surface $5a$ of guide the guide groove 5 is smaller than the angle $\theta_2$ in FIG. 1; said wall surface $5a$ is steeper than the one shown in FIG. 1. The depth dg of the guide groove 5 is selected to ensure that tracking error signals may be adequately obtained. For this purpose, it has already been pointed out that the phase difference between the zero-th diffraction light and the positive and negative primary diffraction light is set to be around $\pi/2$ radian. In consideration of the fact that the light wave is the cyclic function, and the positive or negative phase difference is derived simply by reversal of the polarity of the tracking error signals and thus there is no essential difference in the capability of error detection, then the phase difference may be $$\frac{2N \pm 1}{2}\pi$$

radian (where N is any integer). In order to provide the phase difference of $2N \pm 1/2\pi$ radian, the geometrical depth of the guide grooves 5 is selected $$\frac{2N+1}{8n}\lambda$$

(where N=1, 2, 3, ... ) in the present invention. For example, according to an embodiment of the present invention $3\lambda/8n$ is selected as the depth of the grooves 5 in order to obtain the phase difference of $2/3 \pi$ radian. It is to be understood that a constitution with a deeper guide groove will be effective if the membrane thickness of the information recording medium 2 is about 100 nm in the opto-thermal recording method and opto-magnetic recording is included in this case. The information recording medium 2 according to the present embodiment comprises a vertical magnetized amorphous magnetic membrane for opto-magnetic recording and the wavelength of the light for recording/reproducing signals in free space is selected to be 780 nm while the index of refraction n of the base member 1 is selected to be 1.58. It is further to be noted that, the center of the information recording track is located in the land 4. In this instance, since the depth dg of the guide grooves is 185 nm and the inclination angle of the wall surface of the guide grooves is sufficiently steep, the information recording medium 2 made of a magnetic membrane which can be treated by spatter vaporization will be separated at the border between the guide grooves 5 and the lands 4 and thus made discontinuous.

Figure 9A:
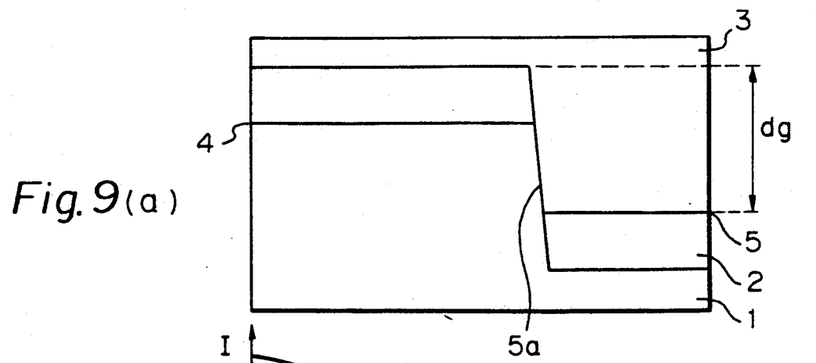
Figure 9B:
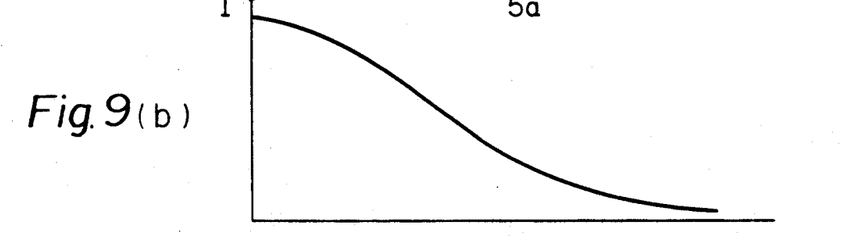
Figure 9C:
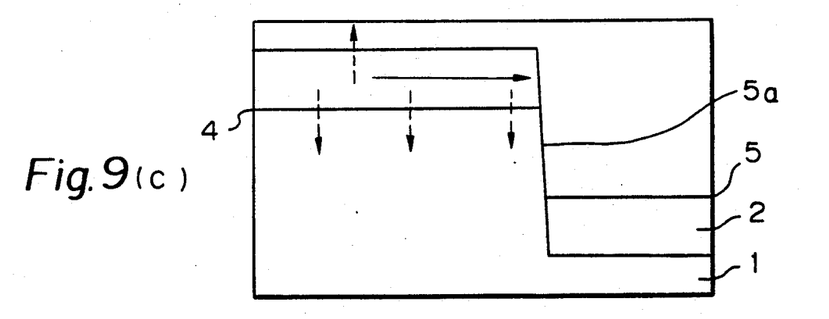
Figure 9D:
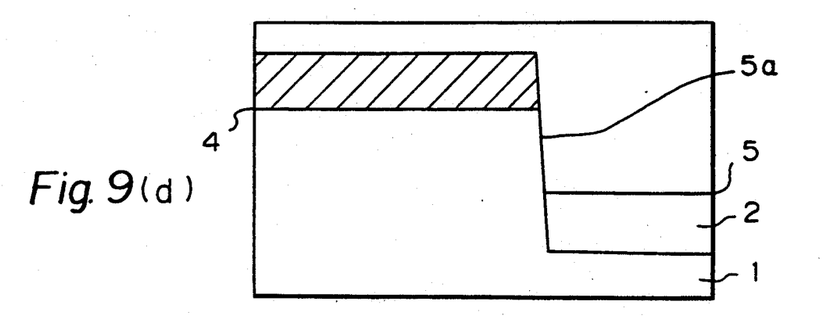
Figure 10:
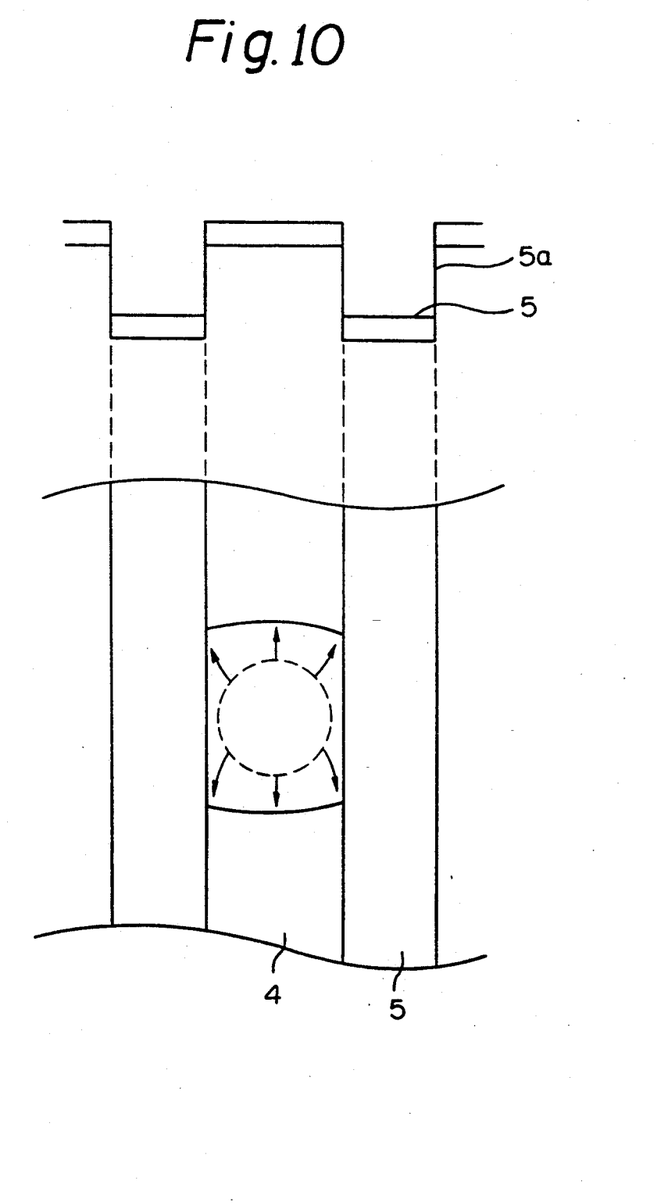

The behavior of the optical type information record carrier constituted as above during the process of recording will next be explained by referring to FIGS. 9 and 10. FIG. 9 (a) illustrates one half of the information recording track extending from the center thereof to the center of a guide groove 5.

If the intensity distribution of the light spots at the time of recording is as shown in FIG. 9 (b), then the initial temperature distribution also takes the same form as that shown in FIG. 9 (b), or the temperature is higher toward the center of the information recording track. Due to this temperature difference, the heat will start to be circumferentially. However, as explained already in connection with the prior art, since the coefficient of thermal conductivity of the base member 1 and the protective layer 3 is far below that of the amorphous magnetic member, the caloric energy which is conducted through the base member 1 and the protective layer 3 (as indicated by the arrowed dotted line in FIG. 9 (c) is so small that the majority of the caloric energy will spread along the amorphous magnetic member in the direction shown by the arrowed solid line. However, since the amorphous magnetic layer 2 is discontinued at the wall surface 5a of the guide groove 5, thermal conduction will cease at the wall surface 5a. Accordingly, the record bits will not be extended into the guide groove 5 and a recording bit like that shown by the shaded portion in FIG. 9 will be formed. It can be seen from the plan view in FIG. 10 that the circle defined by the dotted line in FIG. 10 where the temperature is increased by the light spot will be the recording bit when no thermal conduction is expected. However, since there is such thermal conduction, the area of the recording bit will be expanded. Due to the fact that thermal conduction will cease at the wall surface 5a of the guide groove 5, the thermal flow which has been directed in the tracking direction will be turned to follow the direction of the information recording track near the wall surface, resulting in expansion of the area of the recording bit adjacent to the wall surface 5a. This expansion of the recording bit adjacent to the wall surface is oriented in such a direction as to eliminate round edges of the recording bit and has the effect of improving the resolving power at the time of reading out to an extent close to the theoretical MTF (Modulation Transfer Function).

As explained above, since the edge of the recording bit in the tracking direction is restricted by the wall surface 5a of the guide groove 5, there is no possibility of generation of cross talk when the record bit is expanded, as in the case of prior arts, and also the margin of the recording laser power may be made wider than the prior arts. Even if the laser power varies during recording and tracking is off-set, a recording bit will not be formed on the guide groove 5 so long as off-set tracking is not exceedingly large. Additionally, since the recording area is always located in the land, no noise will be generated as when there is an unerased portion of a recording.

Turning now to the information record carrier of the present embodiment which is adapted to write information input by a user, a header area in which address information and synchronous signals are written is required, as explained in connection with the prior art with reference to FIG. 3.

Figure 11:
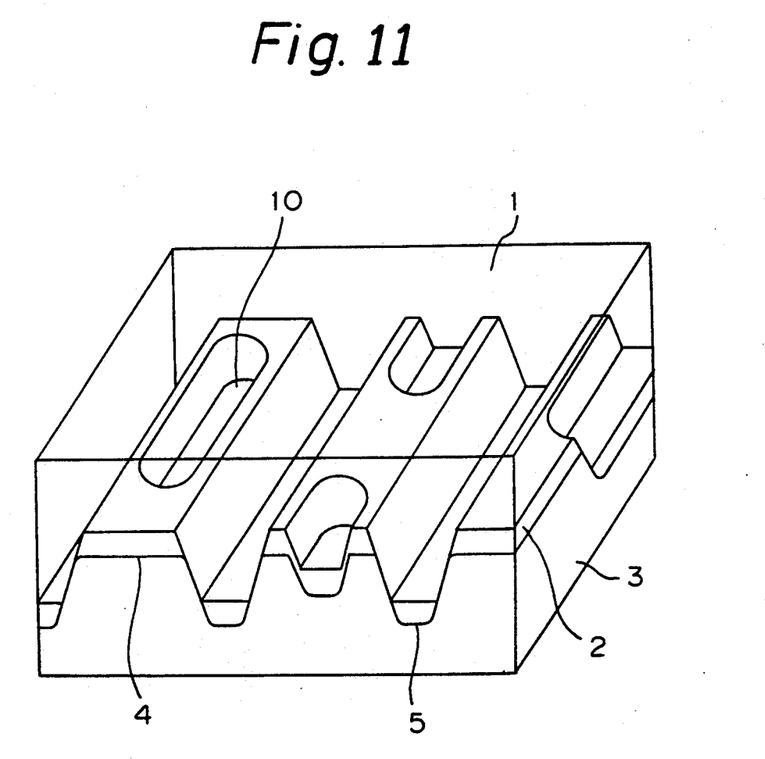
FIG. 11 is a perspective view showing the uneven bits in the area of the header.
Figure 12:
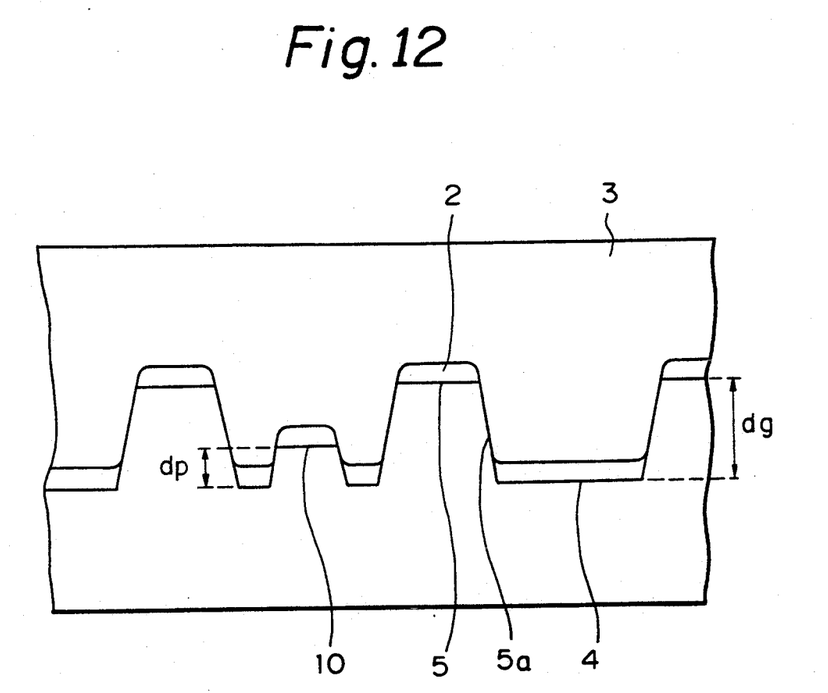
FIG. 12 is a sectional view thereof and FIG. 13 is a sectional view showing another form of the uneven bits.
Figure 13:
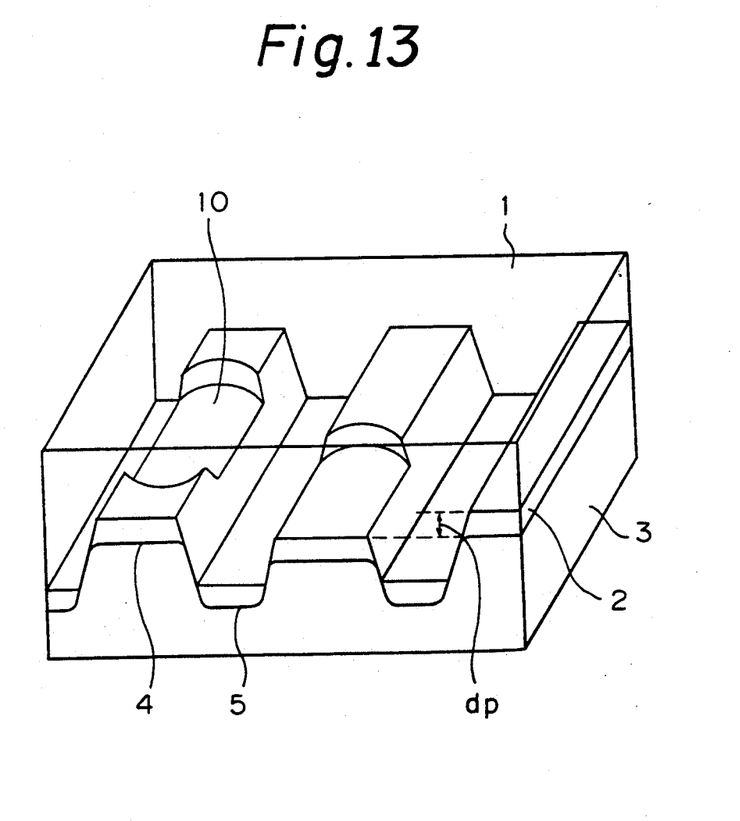

The constitution of the uneven bits in the header area according to the present embodiment will next be explained by referring to FIGS. 11 through 13. FIG. 11 is a perspective view showing the header area and FIG. 12 is a sectional view of the header area. The latter is different from the one used in the prior art in that, since the guide groove 5 is deeper, the depth dp of the bit 10 is less than the depth dg of the guide groove 5. The depth dp of the bit is set, like the prior art, such that the phase difference between the zero-th diffraction light and the positive and negative primary diffraction light will be 180°. However, the geometrical depth needed to obtain said phase difference of 180° is different from that of the prior art. More specifically, since the depth dg of the guide groove 5 is set at $3\lambda/8n$ which exceeds $\lambda/4n$, the guide groove 5 is formed at the recessed portion, from the geometrical viewpoint, and has the same diffraction effect as that of the guide groove of $\lambda/8n$ formed at the projection. In order to attain the phase difference of 180°, the depth dp of the bit has to be shallower than $\lambda/4n$. The shallowness of the depth dp of the bit as determined from $\lambda/4n$ depends on the relationship between the width of the bit 10 and the width of the land 4. In a typical example, when the width of the bit 10 is coincident with the width of the land 4, the depth dp of the bit will be $\lambda/8n$. The above-explained theory is apparently applicable not only to the case where the depth of the guide groove 5 is $3\lambda/8n$ but also to that where said depth is $$\frac{4N+3}{8n}\lambda$$

(N=0, 1, 2, 3, ... ), namely $$\frac{2N+1}{8n}\lambda$$

(N=1, 3, 5, 7, ... ).

Summarizing the above discussion regarding the depth dp of the header area, when the geometric depth of the guide grooves 5 is set at $$\frac{2N+1}{8n}\lambda$$

(N=1, 2, 3, ... ), the depth of the header area is shallower than $\lambda/4n$ and equal to or deeper than $\lambda/8n$.

Figure 14:
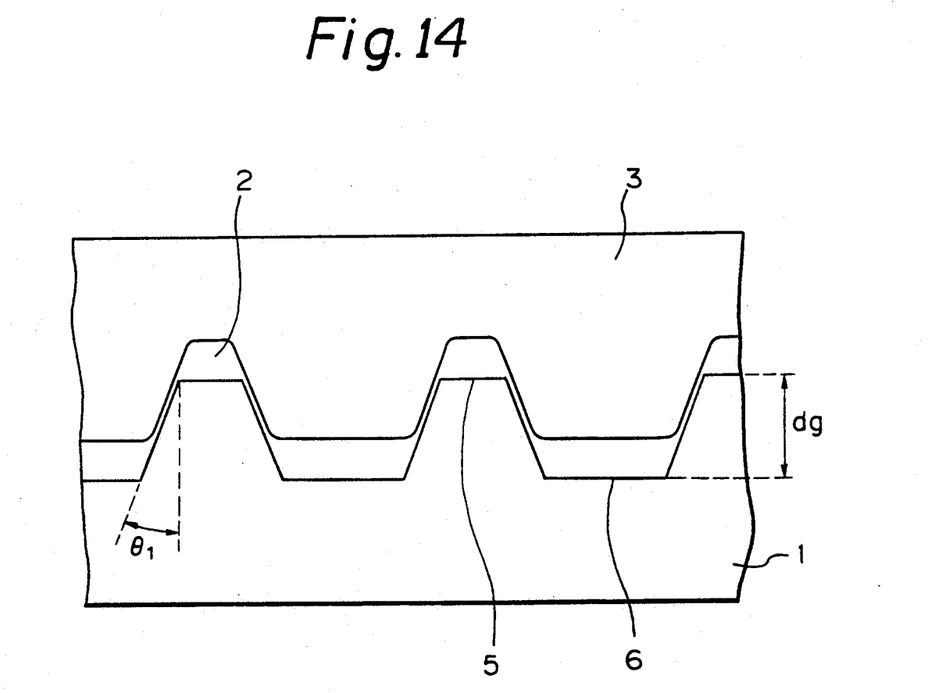
FIG. 14 is a sectional view showing another embodiment of the present invention.

It has been explained in the above-mentioned embodiment that the guide groove 5 and on the land 4 on the information recording medium 2 are divided completely and that the information recording medium 2 will not adhere to the wall surface 5a of the guide groove 5. However, even if thermal distribution is not completely insulated, there will not be any practical problems if thermal conduction is adequately reduced. Like the other embodiment shown in FIG. 14, it is also possible to allow the information recording medium 2 to be thinly applied to the wall surface 5a of the guide groove 5 and, if the thickness of the membrane at the wall surface 5a of the guide groove 5 is less than one-tenth of the thickness of the membranes on the land 4 and the guide groove 5, an adequate thermal insulation effect can be expected. According to this sort of construction, the inclination angle $\theta 1$ of the wall surface 5a of the guide groove may be made larger and better transfer characteristics may be obtained in the case of forming the base member 1 by way of injection molding of a plastic material.

The above embodiment has been explained in connection with an opto-magnetic disc. However it is applicable to any information recording medium if the information recording medium is made of such a material as one having a higher coefficient of thermal conductivity than the base member on which opto-thermal recording is executed. For instance, an alloy used for phase change recording may be used as the information recording medium. The information record carrier need not necessarily be a disc; an optical card may be used instead.

According to the present invention as explained above, since the geometrical depth of the guide groove is made deeper as $$\frac{2N+1}{8n}\lambda$$

(N=1, 2, 3, ... ), and since the inclination of the wall surface of the guide groove is made steeper so that expansion of the information recording bits is stopped by the wall surface of the guide wall, generation of cross talk due to expansion of the information recording bits may be restricted and unerased recording due to variation of laser power or generation of deviated tracking may be prevented. It is further to be noted that if the depth of the uneven bits in the header area is shallower than $\lambda/4n$, better reproduction signals may be obtained as compared to the case of deeper guide grooves.

Having described specific embodiment of our bearing, it is believed obvious that modification and variation of our invention is possible in light of the above teachings.

What is claimed is:

1. An information storage medium responsive to light of wavelength $\lambda$, comprising:
    a base member including a transparent material having an index of refraction n;
    said base member having at least one guide groove formed thereon;
    said base member having at least one land located adjacent said guide groove;
    said at least one guide groove having side walls;
    said at least one guide groove having a geometrical depth of about $$\frac{2N+1}{8n}\lambda,$$

where N is any positive integer; and
    a recording material for storing information and disposed on said at least one land and said at least one guide groove but not on at least a portion of said guide groove side walls so as to inhibit thermal conduction via said side walls when said medium is irradiated with the light wherein each of said side walls has an inclination angle $\theta$ that is less than 45°.

2. An information storage medium as claimed in claim 1, wherein said inclination angle is sufficiently steep so that expansion of any information recording bits in said at least one guide groove is stopped.

3. An information storage medium as claimed in claim 1, wherein said recording material is disposed on a side of said base member to be irradiated by the light.

4. An information storage medium responsive to light of wavelength $\lambda$, comprising:
    a base member including a transparent material having an index of refraction n;
    said base member having at least one guide groove formed thereon;
    said base member having at least one land located adjacent said guide groove;
    said at least one guide groove having side walls;
    said at least one guide groove having a geometrical depth of about $$\frac{2N+1}{8n}\lambda,$$

where N is any positive integer; and
    a recording material for storing information and disposed on said at least one land and said at least one guide groove, said recording material adheres to said side walls when said recording material is disposed on said land and said groove, wherein the thickness of said recording material where adhering to said side walls is made thin enough to inhibit thermal conduction via said side walls when said medium is irradiated with the light, and wherein each of said side walls has an inclination angle $\theta$ that is less than 45°.

5. An information storage medium as claimed in claim 4, wherein said inclination angle is sufficiently steep so that expansion of any information recording bits in said at least one guide groove is stopped.

6. An information storage medium as claimed in claim 4, wherein said recording material is disposed on a side of said base member to be irradiated by the light.

* * * * *